United States Patent
Chavez

(10) Patent No.: US 9,251,504 B2
(45) Date of Patent: *Feb. 2, 2016

(54) CONFIGURING A VIRTUAL REALITY ENVIRONMENT IN A CONTACT CENTER

(75) Inventor: David L. Chavez, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 499 days.

This patent is subject to a terminal disclaimer.

(21) Appl. No.: 13/471,954

(22) Filed: May 15, 2012

(65) Prior Publication Data

US 2013/0051548 A1 Feb. 28, 2013

Related U.S. Application Data

(60) Provisional application No. 61/528,521, filed on Aug. 29, 2011.

(51) Int. Cl.
*G06T 19/00* (2011.01)
*G06Q 10/10* (2012.01)

(52) U.S. Cl.
CPC ............ *G06Q 10/101* (2013.01); *G06Q 10/103* (2013.01); *G06T 19/006* (2013.01)

(58) Field of Classification Search
CPC .... H04M 3/5175; G06Q 10/103; G06Q 10/00
USPC .......................................................... 345/419
See application file for complete search history.

(56) References Cited

U.S. PATENT DOCUMENTS

| | | | |
|---|---|---|---|
| 6,987,846 B1 | 1/2006 | James | |
| 8,082,297 B2 | 12/2011 | Syvain et al. | |
| 8,386,930 B2 | 2/2013 | Dillenberger et al. | |
| 8,601,386 B2 * | 12/2013 | Altberg et al. | 715/771 |
| 8,655,674 B2 * | 2/2014 | Finn et al. | 705/1.1 |
| 2008/0139315 A1 * | 6/2008 | O'Connor et al. | 463/42 |
| 2008/0275794 A1 * | 11/2008 | Ioimo et al. | 705/27 |
| 2009/0240359 A1 | 9/2009 | Hyndman et al. | |
| 2009/0241126 A1 * | 9/2009 | Beggs et al. | 719/318 |
| 2009/0251457 A1 * | 10/2009 | Walker et al. | 345/418 |
| 2009/0307051 A1 * | 12/2009 | Finn et al. | 705/10 |
| 2010/0083140 A1 | 4/2010 | Dawson et al. | |
| 2010/0162121 A1 | 6/2010 | Yoakum et al. | |
| 2010/0164956 A1 * | 7/2010 | Hyndman et al. | 345/427 |
| 2010/0169444 A1 * | 7/2010 | Lingafelt et al. | 709/206 |
| 2010/0169486 A1 | 7/2010 | McCormack et al. | |
| 2010/0169795 A1 | 7/2010 | Hyndman et al. | |
| 2010/0169796 A1 | 7/2010 | Lynk et al. | |
| 2010/0169797 A1 | 7/2010 | Lynk et al. | |

(Continued)

FOREIGN PATENT DOCUMENTS

WO WO 99/17189 4/1999

OTHER PUBLICATIONS

U.S. Appl. No. 13/471,931, filed May 15, 2012, Chavez.
U.S. Appl. No. 13/471,890, filed May 15, 2012, Chavez.
"Avaya web.alive™ Enterprise Collaboration Experience," Avaya, Aug. 2011, 4 pages.

(Continued)

*Primary Examiner* — Kee M Tung
*Assistant Examiner* — Ryan M Gray
(74) *Attorney, Agent, or Firm* — Sheridan Ross P.C.

(57) ABSTRACT

A system and method are provided. A virtual reality environment rendering module provides a virtual reality environment representative of one or more of a contact center, a predictive dialer, and a media collaboration session. The virtual reality environment is configured based on collected information of various types.

22 Claims, 4 Drawing Sheets

(56) References Cited

U.S. PATENT DOCUMENTS

| | | | |
|---|---|---|---|
| 2010/0169798 A1 | 7/2010 | Hyndman et al. | |
| 2010/0169799 A1 | 7/2010 | Hyndman et al. | |
| 2010/0169837 A1 | 7/2010 | Hyndman | |
| 2010/0235218 A1 | 9/2010 | Erhart et al. | |
| 2010/0257464 A1 | 10/2010 | Renner | |
| 2010/0296417 A1 | 11/2010 | Steiner | |
| 2010/0299180 A1 | 11/2010 | Tsatalos et al. | |
| 2010/0306021 A1* | 12/2010 | O'Connor et al. | 705/9 |
| 2010/0313147 A1* | 12/2010 | Hartman et al. | 715/757 |
| 2011/0055927 A1 | 3/2011 | Hamilton et al. | |
| 2011/0066938 A1* | 3/2011 | Nageswaram et al. | 715/706 |
| 2011/0075819 A1* | 3/2011 | Bruce et al. | 379/88.04 |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |

OTHER PUBLICATIONS

Avaya web.alive Fact Sheet, Avaya, Feb. 2011, 4 pages.

Avaya Compact Contact Center—System Supervisor's Manual; 40DHB0002UKDV Issue 1 (Apr. 2003); 96 pages.

Avava—The Power of We; "Avaya web.aliveTM Enterprise Collaboration Experience"; 4 pages, Aug. 2011.

Avaya—Avaya web.alive; Fact Sheet; 4 pages, Feb. 2011.

Official Action for U.S. Appl. No. 13/471,931, mailed Sep. 19, 2014 14 pages.

Final Action for U.S. Appl. No. 13/471,890, mailed Apr. 17, 2015 25 pages.

Notice of Allowance for U.S. Appl. No. 13/471,931, mailed Mar. 31, 2015 12 pages.

* cited by examiner

CONFIGURING A VIRTUAL REALITY ENVIRONMENT IN A CONTACT CENTER

CROSS REFERENCE TO RELATED APPLICATION

The present application claims the benefits of U.S. Provisional Application Ser. No. 61/528,521, filed Aug. 29, 2011, of the same title, which is incorporated herein by this reference in its entirety.

FIELD

The disclosure relates generally to contact centers and particularly to contact center monitoring.

BACKGROUND

Contact centers service incoming contacts from customers while predictive dialing facilities initiate outgoing customer contacts regarding goods and services. An important function in contact centers and predictive dialing facilities is optimizing contact center performance in light of policies and objectives while substantially minimizing costs and maximizing customer satisfaction. Many performance metrics and analytics algorithms have been created to evaluate and control contact center performance but further improvements are required.

Virtual Reality ("VR") offers a vehicle not only to substantially optimize contact center performance but also substantially minimize costs and maximize customer satisfaction. VR applies to a computer-simulated environment simulating physical presence in a defined environment, which may emulate the real or an imaginary world. Most current virtual reality environments are primarily visual experiences, displayed either on a computer screen or through special stereoscopic displays, but some simulations include additional sensory information, such as sound through speakers or headphones. VR is increasing rapidly in popularity in many applications, including fictional gaming, radio, motion pictures, and therapeutics.

There is a need to implement VR in a contact center environment to enrich the customer experience, and provide higher levels of customer satisfaction.

SUMMARY

These and other needs are addressed by the various aspects, embodiments, and/or configurations of the present disclosure. The disclosure is directed generally to a contact center virtual reality environment comprising visual representations, particularly avatars, of agents and/or work items, such as contacts and customers.

In an embodiment, a method and system are provided that:

(a) provides a virtual reality environment comprising a plurality of objects, a first object associated with an entity to be serviced and/or a second object associated with a resource for servicing the entity to be serviced; and (b) performs one or more of the following steps/operations:

(i) selects a type, number, position, and/or characteristic of an object based on collected information; and (ii) changes a type, number, position, and/or characteristic of an object based on a detected change in the collected information.

In one configuration, the characteristic is one or more of appearance, voice characteristic, and behavior, and the collected information is one or more of: contact ID, contact type, contact media type, outbound contact initiation method, customer ID, customer presence, data source ID, party ID, business role, party role start date/time, contact direction, contact direction description, contact purpose, contact reason, contact media interaction disposition, contact disposition, contact wait treatment/time, resource identifier, resource type, resource contact information, resource group identifier and/or information, resource percentage time in state by state identifier, current resource state, resource skill, resource skill level, resource performance statistic and/or metric, customer class, customer contact information, customer value indicator, customer historic business level and/or purchase, contact history, contact or contact queue details, longest wait time, percentage of calls answered, average answer time; trunk or trunk group details, and contact center and/or predictive dialer performance statistic, policy, and/or objective.

In one configuration, the characteristic is one or more of appearance, voice characteristic, and behavior, and the collected information is one or more of: a selected resource percentage time in state by state identifier, a current state of the resource, a skill of the resource, a skill level for the resource, a performance statistic of the resource, first-call resolution, service level/response time, average, predicted, forecasted, actual, or mean wait time, forecasting accuracy, service level compliance rate, agent occupancy, conversion rate, up-sell/cross-sell rate, cost per call, serviced entity complaint, first contact resolution rate, transfer rate, number of escalations, and call abandon rate, a time the resource spends reviewing daily alerts or special promotions, a time the resource spends logged into a relevant application, a time the resource spends organizing his or her workspace before servicing a contact, a contact wrap-up activity by the resource, average or total contact handle time by the resource, average speed of answer by the resource, adherence to schedule by the resource, contact service quality by the resource, competency of the resource, resource peak performance index, transfer rate, communication skill of the resource, adherence to a procedure by the resource, and serviced entity satisfaction.

In one configuration, a first virtual reality environment is presented to the resource and a different second virtual reality environment is provided to the entity to be serviced.

In one configuration, the collected information is information received from a federated database maintained by a third party, such as a federated database maintained by an online community.

In one configuration, the plurality of avatars are able to move within the virtual reality environment in response to a command received from a respective resource or entity to be serviced, the entity to be serviced is one or both of a work item and customer, the resource is a human agent, and the collected information is a trigger event arising from a movement of a selected avatar within a coordinate system of the virtual reality environment and/or a sensed or detected focus of the avatar.

In one configuration, the selected or changed characteristic is intended to provide information to and/or influence a selection of one or both of the first and second avatars by a resource and/or an entity to be serviced.

In one configuration, one or both of the resource and entity to be serviced is represented in the virtual reality environment as an avatar. The avatar is able to move within the virtual reality environment in response to a command received from the respective resource or entity to be serviced. When the avatar is within a defined spatial proximity of an object, the avatar is provided with information about the object and/or a media stream involving the object and a resource or customer other than the the resource and entity to be serviced.

In one configuration, when the avatar is within a defined spatial proximity of an object, a session is initiated automatically with an entity associated with the object and, when the avatar moves out of the defined spatial proximity, the session is disconnected automatically.

In one configuration, the virtual reality environment is configured for likes and dislikes of a selected customer receiving the virtual reality environment. Different customers can thus receive differing virtual reality environments.

The present disclosure can provide a number of advantages depending on the particular aspect, embodiment, and/or configuration. The disclosed architecture can change the virtual reality environment based, for example, on system, resource, and/or work item or customer monitored state. The change can be used, for instance, to influence selection of a resource or work item or to convey information to a resource or entity to be serviced. The architecture enables an entity (such as a resource or customer) to customize the appearance of the virtual reality environment and the objects in the environment. The architecture can enrich the customer's experience in interacting with the contact center and increase sales and customer satisfaction levels by customizing the virtual reality environment to permit more effective service of the customer and/or provide a more appealing virtual reality environment for each customer. The architecture can maximize levels of predictive dialer and contact center operations efficiency by using avatar and virtual reality environment configuration to influence resource and/or customer behavior.

These and other advantages will be apparent from the disclosure.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "automatic" and variations thereof refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

An "avatar" is the graphical representation of a person, such as a user, or a person's alter ego or character. It may take either a three-dimensional or four-dimensional form, as in games or virtual worlds, or a two-dimensional form as an icon in Internet forums and other online communities.

A "call center" is a physical place where customer and other telephone calls are handled by or on behalf of an organization. Typically, a call center concurrently handles a considerable volume of calls, which treatment includes screening and forward calls to human or automated resources or agents for servicing.

A "computer-readable medium" refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "contact" refers to an interaction between selected parties/entities over one or more channels. The parties/entities can be human, such as a customer, agent, and supervisor, or nonhuman, such as an Interactive Voice Response unit, a Web server, content analyzer, email server, and the like.

A "contact center" (or a customer interaction center or e-contact center) is a facility within an enterprise from which customer contacts are directed to or managed or serviced by contact center resources. The contact center typically includes one or more online call centers but may include other types of customer contacts, including e-mail newsletters, postal mail catalogs, Web site inquiries and chats, instant messages, and the collection of information from customers during in-store purchasing. A contact center is generally part of an enterprise's overall customer relationship management ("CRM").

The terms "determine", "calculate" and "compute," and variations thereof are used interchangeably and include any type of methodology, process, mathematical operation or technique.

The term "means" shall be given its broadest possible interpretation in accordance with 35 U.S.C., Section 112, paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

A "predictive dialer" dials a list of telephone numbers and connects answered dials to people making calls, often referred to as agents. Predictive dialers use statistical algorithms to minimize the time that agents spend waiting between conversations, while minimizing the occurrence of someone answering when no agent is available.

A "virtual world" or "virtual environment" or "virtual reality environment" is typically an online community that takes the form of a computer-based simulated environment through which users can interact or communicate (such as via video, audio, and/or text communication modalities) with one another and use and create objects. The term has become largely synonymous with interactive virtual reality environments (which have a two-, three or four-dimensional coordinate space), where the users take the form of avatars visible to others and able to move within the virtual reality environment. These avatars usually appear as textual, two-dimensional, three-dimensional, or four-dimensional representations, although other forms are possible (auditory and touch sensations for example). In some virtual worlds, multiple users, by a client, can connect simultaneously to a virtual reality server to interact with one another and with the environment represented by the virtual world. As will be appreciated, the "fourth" dimension referenced herein with respect to the avatar and virtual reality environment can be expressed in many forms. For example, the dimension could be temporally based, or a function of a measure of time. For instance, the dimension could be evolution over time (aging, maturity, expertise and the like). In another example, the dimension is based on localized feedback. Other variations or combinations are also possible for the dimension.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Overview

Figure 1:
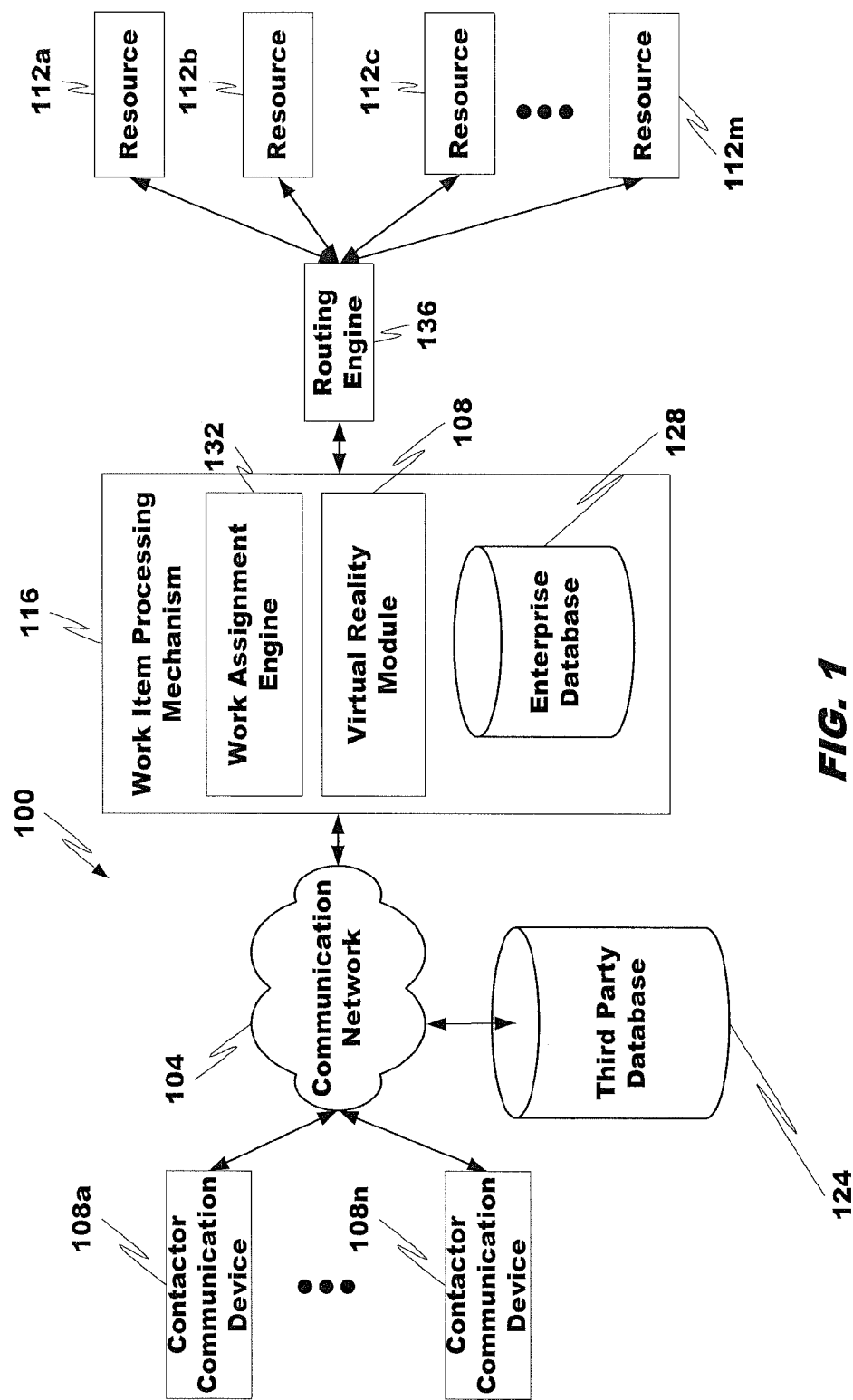
FIG. 1 is a block diagram of a virtual reality communication system according to an embodiment.

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to have a team of agents engage in training while servicing a contact.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

In some embodiments, a virtual reality module is provided that configures and provides a virtual reality environment for resources (e.g., human agents) and customers. The virtual reality environment viewed by a resource and the serviced customer may be the same or different. The virtual reality module, in one configuration, changes the appearance (e.g., size, shape, color, age, sex, attire, facial characteristics, physical characteristic(s), and voice characteristic(s)) and/or behavior of a selected resource's avatar to make the resource more or less attractive to a customer being serviced or potentially serviced by the resource. In one configuration, the virtual reality module changes the appearance of a selected work item or customer's avatar to make the work item more or less attractive and/or informative to a resource servicing or potentially servicing the work item or customer. The work item or customer avatar can include images providing information about the associated contact and/or customer to the resource. Such information can be helpful in the resource pre-viewing the work item, selecting the work item for servicing, and in servicing the work item or customer. The virtual reality module, in one configuration, configures a virtual reality environment, including objects in the environment, to convey information to the resource and/or customer and/or to positively impact the customer's behavior and/or perception of the enterprise.

The virtual reality environment can be interactive, have rules based on reality (e.g., gravity, mass, gravity, topography, locomotion, real-time actions, and communication, etc.) and a two-, three or four-dimensional coordinate space. The virtual reality environment depicts the user(s) and selected object(s) as avatars or other visual or graphical representation visible to the user and possibly to others. The coordinate system can have any configuration, such as a floor plan with multiple rooms, a network site map with work item, customer, or resource avatars at each network node, a circular room with the work item, customer, or resource avatars positioned around the circumference of the room and the other of the resource, work item, or customer avatar in the central interior of the room, and so forth.

As will be appreciated, an avatar is generally a three dimensional rendering of a person or other creature that represents the user in the virtual reality environment. A user corresponding to an avatar selects the appearance of the avatar when creating a profile (such as specifying height, weight, gender, age, hair color, etc) and controls tactilely the movement of the avatar in the virtual reality environment. The avatars usually appear as textual, two-dimensional, three-dimensional, or four-dimensional representations, though other forms are possible (auditory and touch sensations for example). The actual appearance of avatars in the computer-generated virtual reality environment is not important to the concepts discussed herein.

Although avatars are discussed with reference to human contact center agents, it is to be appreciated that avatars can be associated with non-human monitored entities. For example, an avatar can be a picture or image of a selected resource's personal computer, desktop, phone, keyboard or other user input device, etc. It could also be a representation of an automated resource, such as an interactive response unit. As used herein, a "work item" avatar can refer not only to an avatar associated with a set of data structures defining a work item but also to a customer associated with a work item.

The user's avatar, and possibly other avatars, is/are able to move within the virtual reality environment in response to commands received from the user, such as key strokes, mouse cursor movements, user gestures or bodily or eye movements, and the like. The user, for example, can cause the avatar to walk, run, wave, talk, or make other similar movements.

The virtual reality module presents perceptual stimuli to the user based on his or her movement or other interaction with the objects in the virtual reality environment. In some configurations, multiple users, by a corresponding client, connect simultaneously to a virtual reality server to interact with one another and with the virtual reality environment.

A user can see a representation of a portion of the computer-generated virtual reality environment on a display and input commands via his or her user input device, such as a mouse or keyboard. A graphical user interface receives the command(s) and other input(s) from the user and passes the user input to the virtual reality module. The virtual reality module causes the user's avatar or other object under the control of the user to execute the desired action in the virtual reality environment. In this way, the user may control a portion of the virtual reality environment, such as his or her avatar or other objects in contact with the avatar, to change the virtual reality environment.

The Contact Center

FIG. 1 shows an illustrative embodiment of a communication system 100 in accordance with at least some embodiments of the present disclosure. The communication system 100 may be a distributed system and, in some embodiments, comprises a communication network 104 connecting one or more contactor communication devices 108a-n to a work assignment mechanism 116, which may or may not be owned and operated by an enterprise administering a contact center (or predictive dialer or call center) in which a plurality of resources 112a-m are distributed to handle incoming work items (in the form of contacts) from the contactor (e.g., customer) communication devices 108a-n.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art.

In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in copending U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

In accordance with at least some embodiments of the present disclosure, the contactor communication devices 108a-n may comprise any type of known communication equipment or collection of communication equipment. Examples of a suitable contactor communication device 108a-n include, but are not limited to, a personal computer, tablet computer, laptop, Personal Digital Assistant (PDA), cellular phone, smart phone, telephone, or combinations thereof. In general each contactor communication device 108a-n may be adapted to support video, audio, text, and/or data communications with other contactor communication devices 108a-n as well as the processing resources 112a-m. In one application, the contactor communication devices 108a-n are video telephony devices (e.g., videophones, telepresence devices, a camera-equipped cellular or wireless phone, a mobile collaboration device, and a personal, tablet, or laptop computer with a camera or web camera). The type of medium used by the contactor communication device 108a-n to communicate with other contactor communication devices 108a-n or processing resources 112a-m may depend upon the communication applications available on the contactor communication device 108a-n.

In accordance with at least some embodiments of the present disclosure, a contactor may utilize his or her contactor communication device 108a-n to initiate a work item, which is generally a request for a processing resource 112a-m. Exemplary work items include, but are not limited to, a multimedia contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of media or multimedia packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in copending U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the contactor communication device 108a-n and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112a-m is assigned to the work item representing that communication at which point the work assignment mechanism 116 passes the work item assignment decision to a routing engine 136 to connect the contactor communication device 108, which initiated the communication, with the assigned or selected resource 112a-m.

Although the routing engine 136 is depicted as being separate from the work assignment mechanism 116, the routing engine 136 may be incorporated into the work assignment mechanism 116 or its functionality may be executed by the work assignment engine 132.

In accordance with at least some embodiments of the present disclosure, the work item is sent toward a collection of processing resources 112a-m via the combined efforts of the work assignment mechanism 116 and routing engine 136. The resources 112a-m can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112a-m may or may not be owned and operated by a common entity in a contact center format. In some embodiments, the work assignment mechanism 116 may be administered by multiple enterprises, each of which has their own dedicated resources 112a-m connected to the work assignment mechanism 116.

In some embodiments, the work assignment mechanism 116 comprises a work assignment engine 132 which enables the work assignment mechanism 116 to make intelligent routing decisions for work items. In some embodiments, the work assignment engine 132 is configured to administer and make work assignment decisions in a queueless contact center, as is described in copending U.S. patent application Ser. No. 12/882,950, the entire contents of which are hereby incorporated herein by reference.

More specifically, the work assignment engine 132 can determine which of the plurality of processing resources 112a-m is qualified, skilled, and/or eligible to receive the work item and further determine which of the plurality of processing resources 112a-m is best suited to handle the processing needs of the work item. In situations of work item surplus, the work assignment engine 132 can also make the opposite determination (i.e., determine optimal assignment of a work item resource to a resource). In some embodiments, the work assignment engine 132 is configured to achieve true one-to-one matching by utilizing bitmaps/tables and other data structures.

The work assignment engine 132 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

Figure 2:
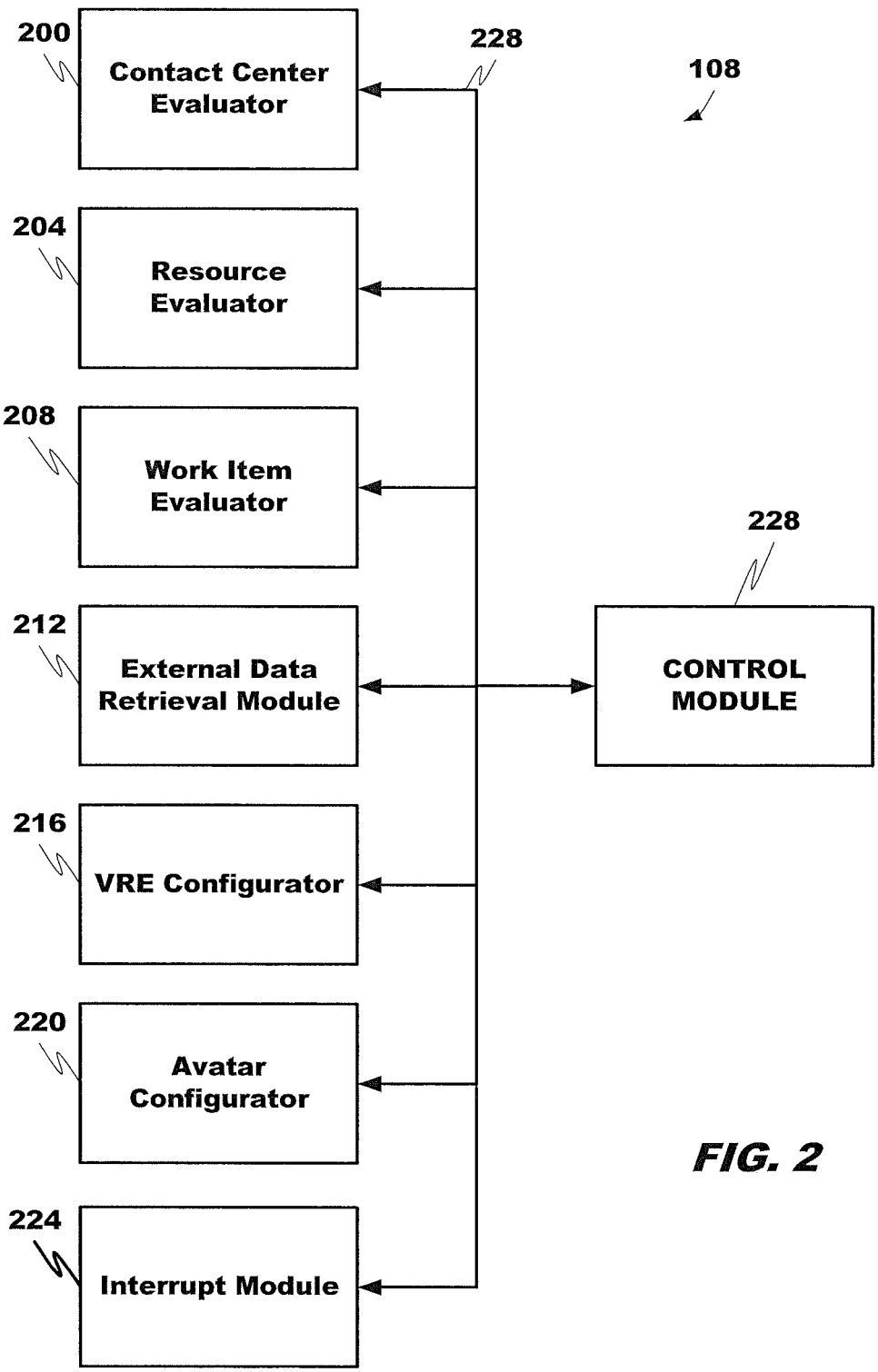
FIG. 2 is a block diagram of virtual reality module according to an embodiment.

In addition to comprising the work assignment engine 132, the work assignment mechanism 116 includes a virtual reality module 108 that may also comprise (with reference to FIG. 2) a number of algorithms, namely a contact center evaluator 200, a resource evaluator 204, a work item evaluator 208, an external data retrieval module 212, a Virtual Reality Environment (VRE) configurator 216, an avatar configurator 220, and an interrupt module 224 supervised by a control module 228, and a database 152 containing various types of contact center and virtual reality information to analyze and service any work item comprising multimedia (i.e., video) information.

The virtual reality module 108, in response to contact center operation(s) and work item(s), configures the virtual reality environment provided both to the customer and servicing resource 112a-m not only to influence customer behavior but also to comply with contact center rules, policies, and objectives by facilitating servicing of work items by resources.

The contact center, resource, and work item evaluators 200, 204 and 208 collect and analyze data, such as by using analytics and summary metrics, and present real time and historical contact center, resource, and work item state information, respectively, to responsible entities in the contact center. For example, key performance indicators (KPIs), quality scores, scheduling information, service level indicators, and other performance metrics can be distributed to contact center resources 112a-m using desktop dashboards. Exemplary performance metrics include a selected resource percentage time in state by state identifier, a current state of the selected resource, a skill of the selected resource, a skill level for the selected resource, a performance statistic of the selected resource (e.g., an agent "scorecard"), and/or compliance with a contact center, predictive dialer, and/or call center performance statistic, rule, policy, and/or objective (e.g., requirement regarding first-call resolution, service level/response time, average, predicted, forecasted, actual, or mean wait time, forecasting accuracy, (e.g, forecasted work load versus actual work load), contact quality, service level compliance rate, agent occupancy, conversion rate, up-sell/cross-sell rate, cost per call, and customer satisfaction (e.g., complaints, first contact resolution rate, transfer rate, number of escalations, and call abandon rate)), the time a resource spends reviewing daily alerts or special promotions, logged into a relevant application, organizing his or her workspace before servicing a contact, contact wrap-up activity, average or total contact handle time, average speed of answer, adherence to schedule (a measurement of how much time during a resource's shift he or she is logged in and handling contacts), contact quality (e.g., courtesy and professionalism, providing customers with correct and relevant information, first-contact resolution (e.g., one-and-done), and grammar and spelling in text communication), analyzed competency, number of escalations, agent peak performance index, transfer rate, communication skills, adherence to procedures, and customer satisfaction.

The external data retrieval module 212 collects information, via communication network 104, from third party database(s) 124, such as social networks, online communities, and other virtual communities, personal web sites, and other enterprises, typically regarding a work item or customer associated with a work item. Such information can include, for example, socioeconomic information, hobbies, interests, employment, family, purchasing habits, appearance (e.g., photographs), relationship with other people, notoriety, popularity, degree of connectedness with others, and other personal information.

The VRE configurator 216, using information collected by the contact center evaluator 200, resource evaluator 204, work item evaluator 208, and/or external data retrieval module 212, configures the virtual reality environment provided to each customer associated with a selected work item and the servicing resource. The VRE configurator 216, for example, determines the type, number, appearance, and positions of objects in the virtual reality environment and the specific resources and work item(s)/customer(s) in the virtual reality environment at any one time. "Objects" in the room generally refers to items or entities, including avatars, and can correspond to animate or inanimate items or entities, such as plants, animals, furniture, clothing, documents, terrain features, climatic features, buildings, vehicles, merchandise, and the like. For example, multiple selected resources and work items may be in the virtual reality environment and able to eaves drop on the service transaction of the other pairings of resources and work items and/or able to interact openly with other resources and/or work items during servicing.

The avatar configurator 220, using information collected by the contact center evaluator 200, resource evaluator 204, work item evaluator 208, and/or external data retrieval module 212, configures the avatars in the virtual reality environment provided to each customer associated with a selected work item and the servicing resource. The avatars are typically associated with a resource, work item, and/or customer. The configuration includes not only the appearances of the avatars but also the clothing and attire (and other objects) of the avatar and other icons associated with the avatars (such as dollar signs and other symbols, a background color surrounding the avatar, and the like) and the behavior of the avatars.

The interrupt module 224 monitors contact center, resource, and work item state and, in response, to specific detected states or changes in state and other trigger events generates interrupts to the control module 228 to initiate an update to the virtual reality environment. The update can include not only the objects and avatars in the virtual reality environment but also the appearances of the objects and avatars in the virtual reality environment.

In one configuration, the user interrupt module 216 is a scripted, such as Perl, REXX, JavaScript, VBScript, and Tcl/Tk mapping function designed to listen and watch for trigger events in the virtual reality environment, look up the trigger event in a trigger event table to determine the trigger event type, and pass the trigger event type and associated parameter(s) to a scripted function. As will be appreciated, a script is a program or sequence of instructions that is interpreted or carried out by another program rather than by the computer processor (as in the case of a compiled program). The associated parameters can include the identity of the user who caused the trigger event (if available), any trigger event variables, and a string which can be used by the Scripted logic to select an appropriate action. Similarly, the Scripted mapping function enables input from the contact center evaluator 200, resource evaluator 204, work item evaluator 208, and/or external data retrieval module 212 to be passed to a Scripted function so that interaction with the virtual reality environment content can cause particular actions or events to occur within the virtual reality environment, such as providing, in substantial real time, the selected agent's desktop display, and/or dashboard with relevant information for servicing a work item. As will be appreciated, trigger event detection may be performed by functionality other than and different from the Scripted mapping function. Although the functionality is described as being scripted, it is to be appreciated that the functionality could be a compiled program or a combination of a script and a compiled program.

Trigger events in the virtual reality environment can take many forms. The virtual reality environment may include triggers or trigger events that generate actions when triggered by an activity in the environment. Examples of possible trigger events include when a user enters or leaves a defined region, area, or volume in the virtual reality environment (i.e., the user enters/leaves a partitioned area or room), the user approaches or leaves a particular person, the user starts/stops talking to another user, the user clicks on an object, the user invokes a control feature to enable his or her avatar to take special action within the virtual reality environment, and the user starts/stops/updates content mapped to a surface of the virtual reality environment. A customer can automatically request a resource's attention or assistance, such as through gesture recognition, or via automatic speech recognition of a keyword or key word phrase in an audio stream or keyword or key word phrase in a text string. Other trigger events include gesture recognition, or automatic speech recognition of a keyword or key word phrase in an audio stream or a text string. Further trigger events include commands or requests received from a user interface of the customer. A trigger event could also be the perceived value or rating of the customer, a customer request, a wait time of the contact, or a sensed indicator by the customer of a need for immediate attention, such as detection by an interactive response unit of the contact center of customer frustration or anger. Other actions or stimuli may be captured as trigger events; therefore, this list is not exhaustive but simply shows several examples of possible actions that may be captured and interpreted as triggers.

As the user manipulates his or her avatar within the virtual reality environment, particular events in the virtual reality environment will cause the rendered virtual reality environment to be updated. For example, when the user enters a partitioned area or room and approaches a work item or agent avatar, as appropriate, the action may be interpreted as an event which may cause information (particularly non-virtual world information such as contact center, predetermined dialer, and/or call center information) associated with the selected (approached) avatar or other object to be retrieved by the information manager 204 and provided to the user. As another example, if the user were to move to another room containing a second different avatar or other object the movement would be interpreted as an event to update not only the rendered virtual reality environment but also any non-virtual world information provided to the user. As another example, the focus of the user's avatar, relative to the coordinate system and the various objects indexed or located in the coordinate system, can be a trigger event. The focus may be based on a virtual position, a location, or physical proximity of the avatar, a virtual gesture or touch of the avatar, and/or a view of the avatar. An avatar's view, which can be presented to a corresponding user, can itself depend on the location and/or orientation of the avatar within the virtual reality environment. For example, the avatar's view may depend on the direction in which the avatar is facing and the selected viewing option, such as whether the user has opted to have the view appear as if the user were looking through the eyes of the avatar or whether the user has opted to pan back from the avatar to see a three-dimensional view of where the avatar is located and what the avatar is doing in the three-dimensional computer-generated virtual reality environment.

Returning to FIG. 1, the enterprise database 128 can have any suitable data structure, such as a relational or object oriented data structure, and includes a variety of data, including without limitation contact center, predictive dialer, and/or call center information or objects (e.g., for a contact, contact ID (an internally generated unique identifier of a contact); contact type code (which identifies the type of contact), outbound contact initiation method, customer ID (the identifier(s) of the customer(s) engaged in the contact), data source ID, party ID (the identifier(s) of the parties to the contact), business role code, party role start date/time (the date/time that the contact center recognizes that the party may play a role in interactions with the enterprise), contact direction code, contact direction description, contact purpose, contact reason, contact media interaction disposition, contact disposition, and contact wait treatment/time; for an agent, agent identifier, agent contact information, agent group identifier and information, agent percentage time in state by state identifier, current agent state, agent skill(s), agent skill level for each agent skill, agent performance statistics or metrics, agent avatar, etc.), and for a customer, customer identifier, customer contact information, customer value indicator, customer historic business level and/or purchases, contact history, customer avatar, etc.; contact or contact queue details and other information (e.g., call waiting (number), longest wait time, percentage of calls answered, average answer time, etc.); trunk or trunk group details and other information; contact center, predictive dialer, and/or call center performance statistics, policies, and objectives; and other contact center, predictive dialer, and/or call center information). The enterprise database 128 can further include virtual reality environment information, such as the coordinate system and various objects indexed and/or referenced relative to the coordinate system.

Examples

In an example, a change in state of the contact center and/or trigger event causes a corresponding change in the virtual reality environment. For instance, a predetermined change in a performance metric, as reported by the contact center evaluator 200, may elevate a work item or set of work items to a higher level of importance with respect to the immediacy of service by an agent. In another instance, a predetermined change in a performance metric (e.g., the performance metric falling below or rising above a selected threshold), as reported by the contact center evaluator 200, may move a work item or set of work items to a lower level of importance with respect to the immediacy of service by an agent. In either event the work item or members of a set of work items may have an appearance change, such as in color, size, or other physical characteristic or behavior of the work item's avatar, to signify the change to a servicing resource. The forgoing examples can be particularly important in a queueless contact center in which a resource selects a next work item for servicing from a pool of work items.

In a further example, a change in state of a resource or set of resources and/or trigger event causes a corresponding change in the virtual reality environment. For instance, a predetermined change in a performance metric (e.g., the performance metric falling below or rising above a selected threshold), as reported by the resource evaluator 204, may elevate a resource or set of resources to a higher level of importance with respect to desirability in servicing work items. In another instance, a predetermined change in a performance metric, as reported by the resource evaluator 204, may move a resource or set of resources to a lower level of importance with respect to desirability in servicing work items. In either event, the resource or members of a set of resources may have an appearance change, such as in color, size, or other physical characteristic or behavior of the resource's avatar, to signify the change to a customer associated with a work item awaiting servicing. The forgoing examples can be particularly important in a contact center in which a customer associated with a waiting work item selects one or more resources from a set of resources for service.

In a further example, a change in state of a work item or set of work items and/or a characteristic, behavior, status (classification), historical transaction history, purpose or need, or other information associated with a work item or customer corresponding to a work item and/or trigger event causes a corresponding change in or configuration of the virtual reality environment. For instance, a predetermined change in state of a work item or set of work items and/or a characteristic, behavior, status (classification), historical transaction history, purpose or need, or other information associated with a work item or customer corresponding to or associated with a work item, as reported by the work item evaluator 208, may elevate a work item or set of work items to a higher level of importance with respect to immediacy of servicing. In another instance, a predetermined change in state of a work item or set of work items and/or a characteristic, behavior, or status (classification), historical transaction history, purpose or need, or other information associated with a work item or customer corresponding to or customer associated with a work item, as reported by the work item evaluator 208, may drop a work item or set of work items to a lower level of importance with respect to immediacy of servicing. In either event, the work item or members of a set of work items may have an appearance change, such as in color, size, or other physical characteristic or behavior of the work item's avatar, to signify the change to a resource. The forgoing examples can be particularly important in a queueless contact center in which a resource selects a next work for servicing from a pool of work items.

In a further example, the external data retrieval module 212 retrieves information from a virtual community or personal website of a customer associated with a work item. The retrieved information indicates a potential interest, need, appearance, or other characteristic of the customer. In response, the VRE configurator 216 configures the virtual reality environment presented to the servicing resource or customer during servicing, and/or the avatar configurator 220 selects an appearance, such as in color, size, or other physical characteristic or behavior, of the servicing resource's avatar to positively impact the servicing interaction with the customer and/or of the work item to provide useful information to the servicing resource before or during work item servicing. The appearance of the avatar can be based, for instance, on information collected from an on-line source, such as a social network (e.g., Facebook™ or LinkedIn™).

In a further example, the avatar of a resource or work item has an appearance that is a function primarily of a resource or media type. For example, an automated resource, such as an interactive response unit, would have an appearance different from that of a human agent. In another example, the interactive response unit and human agent would have a substantially similar appearance provided they use a common media type and substantially different appearance if they were to use a different media type.

In another example, automatic speech recognition of a selected term, such as "help" in an audio or text stream or other keyword or key word phrase detection in an audio stream or text string or detected work item avatar gesture or other movement would bring a specific work item to the attention of a resource and/or move the virtual position of the work item into spatial proximity with the resource avatar to avoid the resource needing to recognize the specific work item, determine the specific work item's virtual location, and navigate the resource avatar to the specific work item's virtual location.

In yet another example, the resource or work item avatar, when within a defined (virtual) spatial proximity of an avatar associated with a selected work item or resource, hears, in a type of eavesdropping mode, either the resource's end alone or both the resource's and another work item's customer ends of a live contact session.

In yet another example, the resource or work item avatar, when within a defined (virtual) spatial proximity of an object other than an avatar associated with a product or service available for purchase, is presented, such as by text, audio, and/or video, with information about the product or service.

In yet another example, a new session with a selected resource or work item is initiated by an action undertaken in the virtual reality environment by an avatar relative to the selected resource's or work item's avatar or a resource or work item's customer joins an existing session between a different customer and/or resource by an action undertaken in the virtual reality environment by the subject's avatar relative to the selected resource or work item's avatar associated with the existing session. Initiation of the new session or joining of an existing session can also be caused by other trigger events, such as detection of a keyword or key word phrase spoken by the customer. In one configuration, the action trigger in the virtual reality environment is the (virtual) proximity of the participants' avatars. Once the connection is established, the connection may be managed so that the connection is maintained while the avatars remain proximate each other and is automatically severed once the avatars move away from each other.

In yet another example, an appearance and/or behavior of an avatar of a resource and/or work item (customer) and selected objects in the virtual reality environment are a function of one or more of: a selected resource percentage time in state by state identifier, a current state of the selected resource, a skill of the selected resource, a skill level for the selected resource, a performance statistic of the selected resource (e.g., an agent "scorecard"), and/or compliance with a contact center, predictive dialer, and/or call center performance statistic, rule, policy, and/or objective (e.g., requirement regarding first-call resolution, service level/response time, average, predicted, forecasted, actual, or mean wait time, forecasting accuracy, (e.g. forecasted work load versus actual work load), contact quality, service level compliance rate, agent occupancy, conversion rate, up-sell/cross-sell rate, cost per call, and customer satisfaction (e.g., complaints, first contact resolution rate, transfer rate, number of escalations, and call abandon rate)), the time a resource spends reviewing daily alerts or special promotions, logged into a relevant application, organizing his or her workspace before servicing a contact, contact wrap-up activity, average or total contact handle time, average speed of answer, adherence to schedule (a measurement of how much time during a resource's shift he or she is logged in and handling contacts), contact quality (e.g., courtesy and professionalism, providing customers with correct and relevant information, first-contact resolution (e.g., one-and-done), and grammar and spelling in text communication), analyzed competency, number of escalations, agent peak performance index, transfer rate, communication skills, adherence to procedures, and customer satisfaction.

In yet another example, an appearance and/or behavior of an avatar of a resource and/or work item (customer) and selected objects in the virtual reality environment are a function of one or more of: contact ID (an internally generated unique identifier of a contact); contact type code (which identifies the type of contact), outbound contact initiation method, customer ID (the identifier(s) of the customer(s) engaged in the contact), customer presence (such as provided by a presence server), data source ID, party ID (the identifier(s) of the parties to the contact), business role code, party role start date/time (the date/time that the contact center recognizes that the party may play a role in interactions with the enterprise), contact direction code, contact direction description, contact purpose, contact reason, contact media interaction disposition, contact disposition, and contact wait treatment/time; for an agent, agent identifier, agent contact information, agent group identifier and information, agent percentage time in state by state identifier, current agent state, agent skill(s), agent skill level for each agent skill, agent performance statistics or metrics, agent avatar, etc.), and for a customer, customer identifier or class (e.g., gold, silver, or bronze), customer contact information, customer value indicator, customer historic business level and/or purchases, contact history, customer avatar, etc.; contact or contact queue details and other information (e.g., call waiting (number), longest wait time, percentage of calls answered, average answer time, etc.); trunk or trunk group details and other information; contact center, predictive dialer, and/or call center performance statistics, policies, and objectives; and other contact center, predictive dialer, and/or call center information).

In yet another example, the appearance and/or behavior of an avatar of a resource and/or work item is tailored or customized to the likes or dislikes or other preferences of a selecting party. For instance, when a contact center is experiencing high call volume appearances of the resource avatars could be selected to dissuade the customer from waiting for and selecting an avatar while an avatar representing a self-help automated interactive response unit could be selected to persuade the customer to select the unit. By way of further illustration, when a contact center is experiencing low call volume appearances of the resource avatars could be selected to persuade the customer to wait for and select an avatar while an avatar representing a self-help automated interactive response unit could be selected to dissuade the customer to select the unit. In a further illustration, when a predetermined resource is preferred by the contact center to service a selected work item, the avatar of the predetermined resource could be configured to appeal to the likes of the customer associated with the work item while the appearances of the other resource avatars would be configured to appeal to the dislikes of the customer. In a further illustration, when a predetermined work item is preferred by the contact center to be serviced by a selected resource, the avatar of the predetermined work item could be configured to appeal to the likes of the resource while the appearances of the other work items would be configured to appeal to the dislikes of the resource. In this example, a given resource may have differently appearing avatars presented to differing customers or alternatively a given work item may have differently appearing avatars presented to differing resources.

In yet another example, a resource or resource supervisor, in response to work item avatar appearance or other characteristic or a change therein can change a queue position of the work item, such as to advance the work item to a position closer to the head of the queue or move the work item to a position further away from the head of the queue.

In yet another example, an avatar has multiple appearances and/or behaviors depending on the endpoint or user viewing the avatar. For instance, a first resource has a first avatar appearance to himself but a second different avatar appearance to a customer being serviced by the first resource. In a further illustration, a first resource has a first avatar appearance to a first customer but a second different avatar appearance to a second customer. In a further illustration, a first work item or customer has a first avatar appearance to the customer (which may be selected by the customer) but a second different avatar appearance to a resource servicing the first work item. In a further illustration, a first work item or customer has a first avatar appearance to a first resource but a second different avatar appearance to a second resource.

In yet another example, a virtual reality environment appears differently to different participants in the virtual reality environment. For instance, a resource can receive a first virtual reality environment, and a customer associated with a work item being serviced by a resource a second virtual reality environment. The first and second virtual reality environments have differing appearances, such as differently appearing avatars, different constituent objects, different backgrounds, and the like.

In yet another example, a virtual reality environment in a contact center has the appearance of the resource avatar(s) located in a corridor, room, or other defined area, with work item avatars virtually interacting with the resource avatars and progressing through a path of travel (which represents the queue) to the resource avatars. The serviced work item avatars exit the resource avatar-containing area through an exit.

In yet another example, only one endpoint to the resource/customer transaction receives a virtual reality environment view of the transaction and the other endpoint does not. By way of illustration, a customer or contactor communication device may receive a virtual reality environment containing an avatar of a resource and other animate and inanimate images of objects while the servicing resource has a non-virtual-reality-environment display not containing avatars or other object images or a virtual reality environment coordinate system. The converse is also possible.

In yet another example, an avatar of a customer associated with a work item awaiting servicing is positioned in a virtual reality environment containing merchandise purchased previously by the customer, a possession of the customer (e.g., a car, house, and the like), documents received by or generated based on input from the customer, avatars of friends and/or family members of the customer, and the like. The customer is thus provided with a more appealing the virtual reality environment. By way of illustration, the customer's avatar could be placed in a room containing a make and model of a vehicle of the customer, and the customer's avatar could move around the vehicle and, as part of an explanation of an operation issue or repairs needed, point to various parts of the vehicle.

In yet another example, a customer associated with a work item awaiting servicing or being serviced is placed in a virtual reality environment containing a background different from or similar to the customer's place of residence, a prior travel or vacation destination, a customer's place of employment, and the like.

In yet another example, a customer associated with a work item awaiting servicing or being serviced is placed in a virtual reality environment resembling a store along with the avatars of other actual (current and/or past) or hypothetical or fictional customers. One or more servicing resources would also have avatars in the store servicing the customer avatars. Graphical icons or images associated with merchandise would be in the store and could be manipulated by the avatars. A selected customer could view and/or hear, as if he or she were in the store, one or more selected interactions between agent and customer avatars. The merchandise purchased by other customers could be a function of the merchandise selected, such as an electronic shopping cart, by a selected customer.

Flowcharts

The operations of the various modules will now be discussed with reference to FIGS. 3-4.

Figure 3:
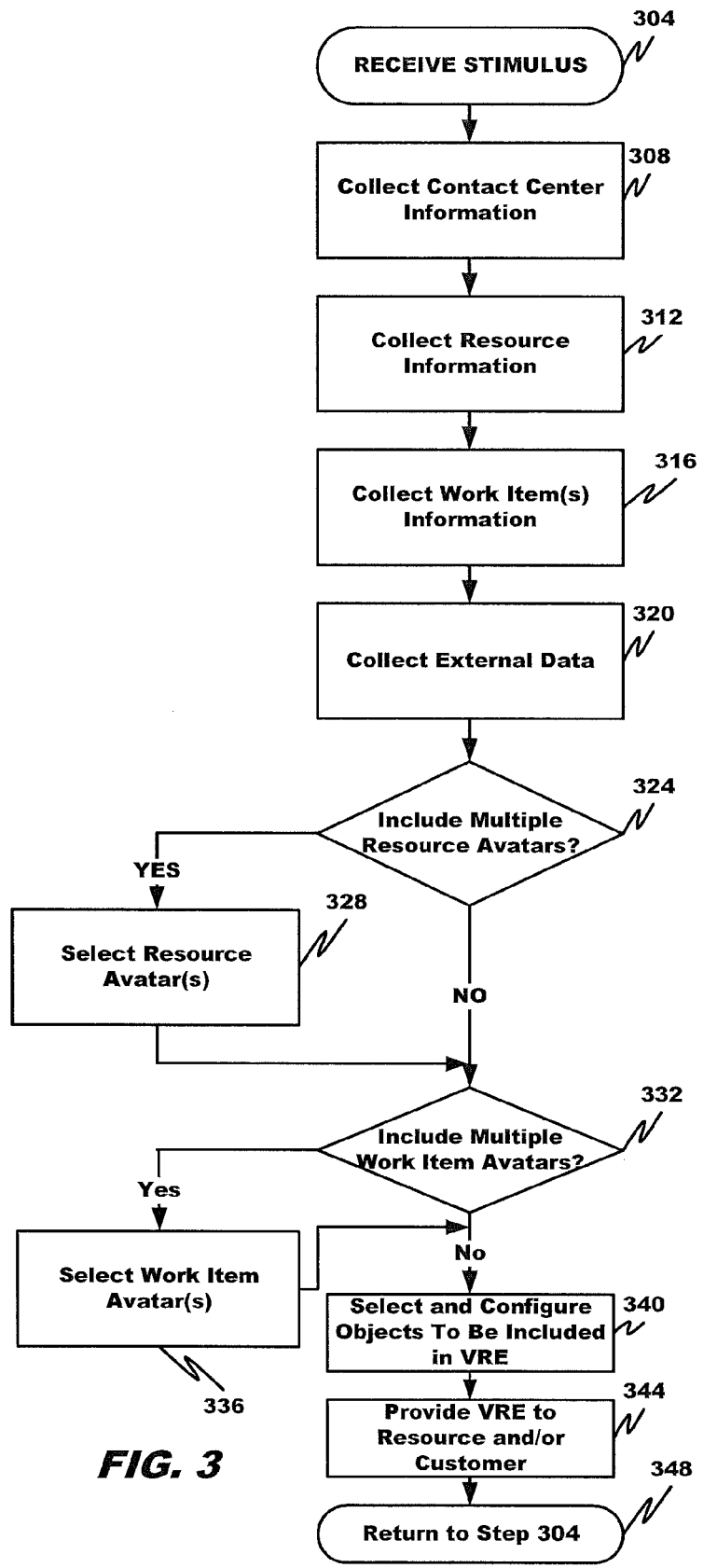
FIG. 3 depicts a flowchart according to an embodiment.

Referring to FIG. 3, the operation of the VRE configurator 216 will be discussed.

In step 304, the control module 228 or interrupt module 224 receives a stimulus. The stimulus requires the virtual reality module 108 to create and/or update the virtual reality environment provided to a user, whether a resource or customer. The stimulus may be passage of a predetermined period of time, system interrupt (such as in response to detection of a trigger event), request by the control module 228, and/or request by the resource or customer.

In step 308, the contact center evaluator 200 collects information regarding the state and/or operation of the contact center (including the information discussed above).

In step 312, the resource evaluator 204 collects information regarding one or more selected resources (including the information discussed above).

In step 316, the work item evaluator 208 collects work item information (including the information discussed above) about one or more selected work items.

In step 320, the external data retrieval module 212 collects external data from one or more third party databases 124.

In decision diamond 324, the VRE configurator 216 determines, based on the information collected in one or more of steps 308, 312, 316, or 320 whether or not to include multiple resource avatars in a selected virtual reality environment (which may be displayed discretely to a selected resource or customer or commonly to both). When multiple resource avatars are to be included in the selected virtual reality environment, the VRE configurator 216 in step 328 selects the resources and therefore resource avatars to be included in the selected virtual reality environment. After completing step 328 or when no other resource avatars (other than the resource avatar of the currently or potentially servicing resource) are to be included in the selected virtual reality environment, the VRE configurator 216 proceeds to decision diamond 332.

In decision diamond 332, the VRE configurator 216 determines, based on the information collected in one or more of steps 308, 312, 316, or 320 whether or not to include multiple work item avatars in the selected virtual reality environment (which may be displayed discretely to a selected resource or customer or commonly to both). When multiple work item avatars are to be included in the selected virtual reality environment, the VRE configurator 216 in step 336, selects the work items and therefore work item avatars to be included in the selected virtual reality environment. After completing step 336 or when no other work item avatars (other than the work item avatar currently or potentially being serviced) are to be included in the selected virtual reality environment, the VRE configurator 216 proceeds to decision diamond 340.

In step 340, the VRE configurator 216, selects and configures the objects (including the resource and work item avatars) to be included in the selected virtual reality environment. The configurations of the resource and agent avatars are received from the avatar configurator 220 (discussed below).

In step 344, the selected virtual reality environment is provided to one or more resources and/or to one or more customers associated with one or more pending work items.

The process then returns, in step 348, to step 304 until a further stimulus is received.

Figure 4:
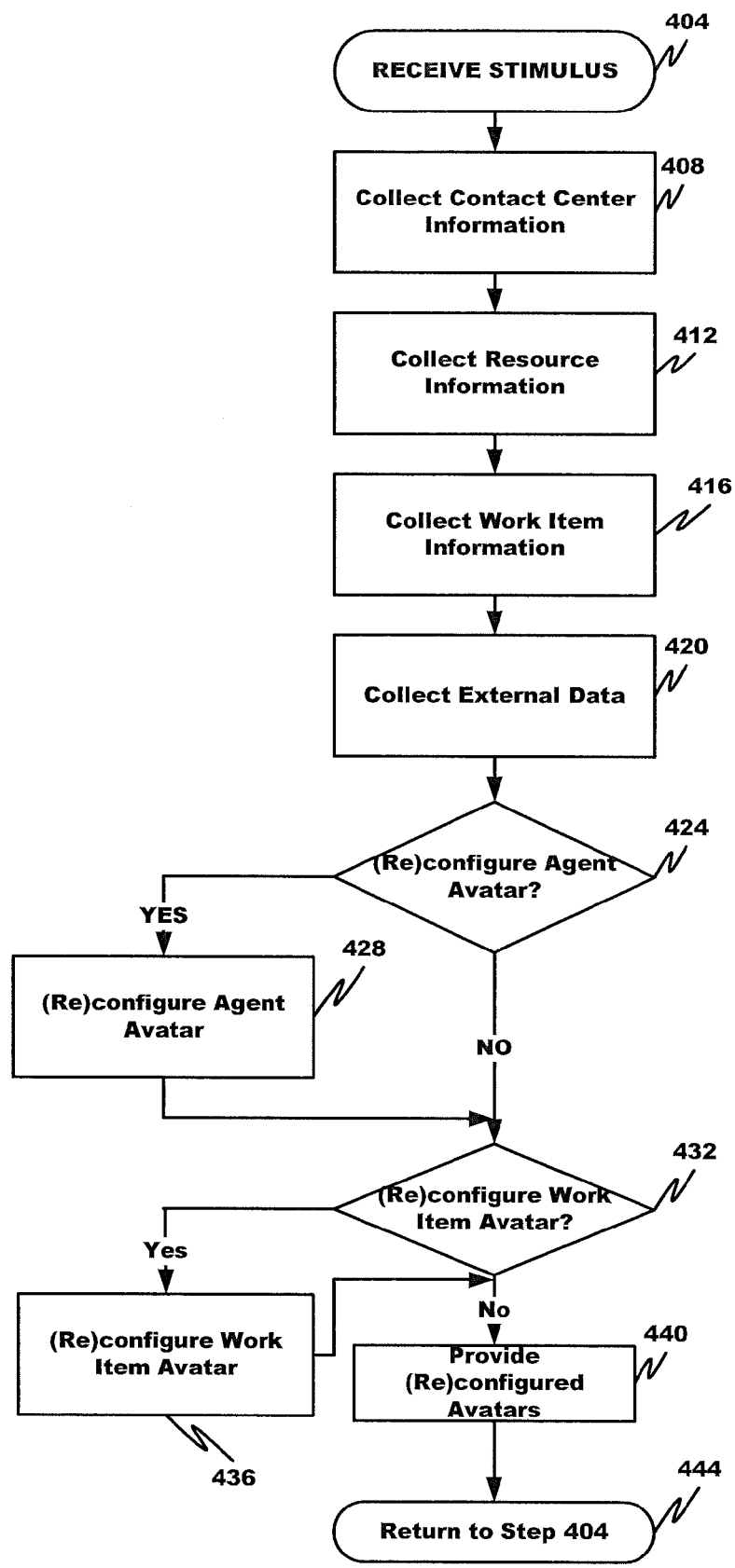
FIG. 4 depicts a flowchart according to an embodiment.

Referring now to FIG. 4, the operation of the avatar configurator 220 will be discussed.

In step 404, the control module 228 or interrupt module 224 receives a stimulus. The stimulus requires the virtual reality module 108 to create and/or update the virtual reality environment provided to a user, whether a resource or customer. The stimulus may be passage of a predetermined period of time, system interrupt (such as in response to detection of a trigger event), and/or request by the VRE configurator 216 or control module 228.

In step 408, the contact center evaluator 200 collects information regarding the state and/or operation of the contact center (including the information discussed above).

In step 412, the resource evaluator 204 collects information regarding one or more selected resources (including the information discussed above).

In step 416, the work item evaluator 208 collects work item information (including the information discussed above) about one or more selected work items.

In step 420, the external data retrieval module 212 collects external data from one or more third party databases 124.

In decision diamond 424, the avatar configurator 220 determines, based on the information collected in one or more of steps 308, 312, 316, or 320 whether or not to (re)configure one or more resource avatars in the selected virtual reality environment (which may be displayed discretely to a selected resource or customer or commonly to both). When one or more resource avatars are to be (re)configured, the avatar configurator 220 in step 428 selects the resources and therefore resource avatars to be (re)configured. After completing step 428 or when no resource avatar(s) are to be (re)configured, the avatar configurator 220 proceeds to decision diamond 432.

In decision diamond 432, the avatar configurator 220 determines, based on the information collected in one or more of steps 308, 312, 316, or 320 whether or not to (re)configure one or more work item avatars in the selected virtual reality environment (which may be displayed discretely to a selected resource or customer or commonly to both). When one or more work item avatars are to be (re)configured, the avatar configurator 220, in step 436, selects the work items and therefore work item avatars to be included in the selected virtual reality environment. After completing step 436 or when no other work item avatars (other than the work item avatar currently or potentially being serviced) are to be included in the selected virtual reality environment, the avatar configurator 220 proceeds to step 340 and, in step 440, provides the (re)configured avatars to the VRE configurator 216.

The process then returns, in step 444, to step 404 until a further stimulus is received.

As will be appreciated, the process of FIGS. 3-4 may be combined into a single process in many applications.

The exemplary systems and methods of this disclosure have been described in relation to a networked set of computational components. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the virtual communication system 100 is used for teaching students or pupils remotely via a collaborative session. In the virtual reality environment, the teacher or instructor would have a corresponding avatar viewable by the students and the students, or the work items, would have corresponding avatars viewable not only by the teacher but also by one another. The avatars would be human-like and have human-like capabilities. The student avatars would be arranged before the teacher or instructor avatar in a classroom-like setting at desks or other stations. For instance, student avatars could raise their virtual hands, speak up virtually, or ask a textual question virtually. As each student avatar performs one of these activities or is otherwise prompted by the teacher or instructor, the virtual classroom would be rearranged such that the student avatar and/or his or her desk would come to the front of the virtual classroom to the attention of the other avatars.

For example in an alternative embodiment, the virtual communication system is employed in a physical storefront. The resources, or store employees, carry communication devices providing a virtual reality environment of the store floor plan showing customers at various store locations. The objects, or merchandise, being viewed by each customer would be viewable by the resource.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:

providing a contact center for directing customer contacts to contact center resources, managing customer contacts, and/or servicing customer contacts by contact center resources;

providing, by a microprocessor executable virtual reality module, a virtual reality environment associated with the contact center, the virtual reality environment comprising a plurality of virtual reality objects, a first virtual reality object being associated with a human entity to be serviced and a second virtual reality object being associated with a human contact center resource for servicing the human entity to be serviced; and performing at least one of the following steps:

(i) selecting, based on collected information, a type, number, position, and/or characteristic of a selected virtual reality object in the virtual reality environment, wherein the collected information is one or more of: contact ID, contact type, contact media type, outbound contact initiation method, customer ID, customer presence, data source ID, party ID, party role start date/time, contact direction, contact direction description, contact purpose, contact reason, contact media interaction disposition, contact disposition, contact wait treatment/time, resource identifier, resource type, resource contact information, resource group identifier and/or information, resource percentage time in state by state identifier, current resource state, resource skill, resource skill level, resource performance statistic and/or metric, customer class, customer contact information, customer value indicator, customer historic business level and/or purchase, contact history, contact or contact queue details, longest wait time, percentage of calls answered, average answer time, trunk or trunk group details, and contact center and/or predictive dialer performance statistic, policy, and/or objective; and (ii) changing, based on a detected change in the collected information, a type, number, position, and/or characteristic of the selected virtual reality object in the virtual reality environment, wherein the collected information is one or more of: a selected resource percentage time in state by state identifier, a current state of the resource, a skill of the resource, a skill level for the resource, a performance statistic of the resource, first-call resolution, service level/response time, average, predicted, forecasted, actual, or mean wait time, forecasting accuracy, service level compliance rate, agent occupancy, conversion rate, up-sell/cross-sell rate, cost per call, serviced entity complaint, first contact resolution rate, transfer rate, number of escalations, and call abandon rate, a time the resource spends reviewing daily alerts or special promotions, a time the resource spends logged into a relevant application, a time the resource spends organizing his or her workspace before servicing a contact, a contact wrap-up activity by the resource, average or total contact handle time by the resource, average speed of answer by the resource, adherence to schedule by the resource, contact service quality by the resource, competency of the resource, resource peak performance index, transfer rate, communication skill of the resource, adherence to a procedure by the resource, and serviced entity satisfaction, wherein, for each of (i) and (ii), the selected virtual reality object corresponds to one of the human entity to be serviced and the human resource for servicing the entity to be serviced and the virtual reality environment simultaneously comprises virtual reality objects for multiple human entities to be serviced.

2. The method of claim 1, wherein step (i) is performed and wherein the collected information is one or more of: contact ID, contact type, contact media type, outbound contact initiation method, customer ID, customer presence, data source ID, party ID, party role start date/time, contact direction, contact direction description, contact purpose, contact reason, contact media interaction disposition, contact disposition, contact wait treatment/time, resource identifier, resource type, resource contact information, resource group identifier and/or information, resource percentage time in state by state identifier, current resource state, resource performance statistic and/or metric, customer class, customer contact information, customer value indicator, customer historic business level and/or purchase, contact history, contact or contact queue details, longest wait time, percentage of calls answered, average answer time; trunk or trunk group details, and contact center and/or predictive dialer performance statistic, policy, and/or objective.

3. The method of claim 1, wherein step (ii) is performed and wherein the collected information is one or more of: a selected resource percentage time in state by state identifier, a performance statistic of the resource, first-call resolution, service level/response time, average, predicted, forecasted, actual, or mean wait time, forecasting accuracy, service level compliance rate, agent occupancy, conversion rate, up-sell/cross-sell rate, cost per call, serviced entity complaint, first contact resolution rate, transfer rate, number of escalations, and call abandon rate, a time the resource spends reviewing daily alerts or special promotions, a time the resource spends logged into a relevant application, a time the resource spends organizing his or her workspace before servicing a contact, a contact wrap-up activity by the resource, average or total contact handle time by the resource, average speed of answer by the resource, adherence to schedule by the resource, contact service quality by the resource, competency of the resource, resource peak performance index, transfer rate, communication skill of the resource, adherence to a procedure by the resource, and serviced entity satisfaction.

4. The method of claim 1, wherein a first virtual reality environment is presented to the resource and a second virtual reality environment is provided to the entity to be serviced, and wherein the first and second virtual reality environments are different.

5. The method of claim 1, wherein the collected information is information received from a federated database maintained by a third party and wherein the federated database is maintained by an online community.

6. The method of claim 1, wherein the selected virtual reality object is not representative of a resource, work item, or customer, wherein an avatar representative of the resource or an entity to be serviced is able to move within the virtual reality environment in response to a command received from the respective resource or entity to be serviced, wherein the entity to be serviced is at least one of a work item and customer, wherein the resource is a human agent, and wherein the collected information is a trigger event arising from at least one of a movement of the avatar within a coordinate system of the virtual reality environment and a sensed focus of the avatar.

7. The method of claim 1, wherein the selected or changed characteristic is intended to provide information to and/or influence a selection of the resource and/or entity to be serviced.

8. The method of claim 7, wherein the changed virtual reality object is associated with a work item or customer and wherein the characteristic is changed by changing an appearance of the virtual reality object and/or voice characteristic and/or behavior of the virtual reality object.

9. The method of claim 7, wherein the changed virtual reality object is associated with a resource and wherein the characteristic is changed by changing an appearance of the virtual reality object and/or voice characteristic and/or behavior of the virtual reality object.

10. The method of claim 1, wherein the at least one of the resource and entity to be serviced is represented in the virtual reality environment as an avatar, wherein the avatar is able to move within the virtual reality environment in response to a command received from the respective resource or entity to be serviced, and wherein, when the avatar is within a defined spatial proximity of an object, the avatar is at least one of provided with information about the object and a media stream involving the object and a resource or customer other than the at least one of the resource and entity to be serviced.

11. The method of claim 1, wherein the contact center comprises a predictive dialer, wherein the at least one of the resource and entity to be serviced is represented in the virtual reality environment as an avatar, wherein the avatar is able to move within the virtual reality environment in response to a command received from the respective resource or entity to be serviced, and wherein, when the avatar is within a defined spatial proximity of an object, a session is initiated automatically with an entity associated with the object and, when the avatar moves out of the defined spatial proximity, the session is disconnected automatically.

12. The method of claim 1, wherein the virtual reality environment is configured for likes and dislikes of a selected customer receiving the virtual reality environment and wherein different customers receive differing virtual reality environments.

13. A tangible and non-transitory computer readable medium comprising microprocessor executable instructions that, when executed by the processor, perform the steps of claim 1.

14. A system, comprising:
a plurality of resource communication devices corresponding to a plurality of human resources to service work items, each work item corresponding to a customer;
a work assignment engine operable to assign entities to be serviced to human resources for servicing; and
a microprocessor executable virtual reality module operable to provide a virtual reality environment comprising a plurality of objects, a first object being associated with an entity to be serviced and a second object being associated with a human resource for servicing the entity to be serviced, and select and/or change a characteristic of a selected one of the first and second objects to provide information to and/or influence a selection of the entity to be serviced and human resource, respectively, wherein a common virtual reality environment simultaneously comprises objects for multiple entities to be serviced and wherein at least one of the following is true:
  (i) the selected object is the first object, the entity to be serviced being a work item and/or customer, wherein the characteristic is changed, before the entity is serviced by the human resource, by changing an appearance and/or voice characteristic and/or behavior of the selected object; and
  (i) the selected object is the second object, wherein the characteristic is changed, before the entity is serviced by the human resource, by changing an appearance and/or voice characteristic and/or behavior of the selected object.

15. The system of claim 14, wherein the virtual reality module selects a type, number, position, and/or characteristic of an object based on collected information and wherein the collected information is one or more of: contact ID, contact type, contact media type, outbound contact initiation method, customer ID, customer presence, data source ID, party ID, party role start date/time, contact direction, contact direction description, contact purpose, contact reason, contact media interaction disposition, contact disposition, contact wait treatment/time, resource identifier, resource type, resource contact information, resource group identifier and/or information, resource percentage time in state by state identifier, current resource state, resource performance statistic and/or metric, customer class, customer contact information, customer value indicator, customer historic business level and/or purchase, contact history, contact or contact queue details, longest wait time, percentage of calls answered, average answer time; trunk or trunk group details, and contact center and/or predictive dialer performance statistic, policy, and/or objective.

16. The system of claim 14, wherein the virtual reality module changes a type, number, position, and/or characteristic of an object based on a detected change in the collected information and wherein the collected information is one or more of: a selected resource percentage time in state by state identifier, a performance statistic of the resource, first-call resolution, service level/response time, average, predicted, forecasted, actual, or mean wait time, forecasting accuracy, service level compliance rate, agent occupancy, conversion rate, up-sell/cross-sell rate, cost per call, serviced entity complaint, first contact resolution rate, transfer rate, number of escalations, and call abandon rate, a time the resource spends reviewing daily alerts or special promotions, a time the resource spends logged into a relevant application, a time the resource spends organizing his or her workspace before servicing a contact, a contact wrap-up activity by the resource, average or total contact handle time by the resource, average speed of answer by the resource, adherence to schedule by the resource, contact service quality by the resource, competency of the resource, resource peak performance index, transfer rate, communication skill of the resource, adherence to a procedure by the resource, and serviced entity satisfaction.

17. The system of claim 14, wherein a first virtual reality environment is presented to the resource and a second virtual reality environment is provided to the entity to be serviced, and wherein the first and second virtual reality environments are different.

18. The system of claim 14, wherein the collected information is information received from a federated database maintained by a third party and wherein the federated database is maintained by an online community.

19. The system of claim 14, wherein (i) is true, wherein the object is not representative of a resource, work item, or customer, wherein an avatar representative of the resource or an entity to be serviced is able to move within the virtual reality environment in response to a command received from the respective resource or entity to be serviced, wherein the entity to be serviced is at least one of a work item and customer, wherein the resource is a human agent, and wherein the collected information is a trigger event arising from at least one of a movement of the avatar within a coordinate system of the virtual reality environment and a sensed focus of the avatar.

20. The system of claim 14, wherein the at least one of the resource and entity to be serviced is represented in the virtual reality environment as an avatar, wherein the avatar is able to move within the virtual reality environment in response to a command received from the respective resource or entity to be serviced, and wherein, when the avatar is within a defined spatial proximity of an object, the avatar is at least one of provided with information about the object and a media stream involving the object and a resource or customer other than the at least one of the resource and entity to be serviced.

21. The system of claim 14, wherein (ii) is true, wherein the at least one of the resource and entity to be serviced is represented in the virtual reality environment as an avatar, wherein the avatar is able to move within the virtual reality environment in response to a command received from the respective resource or entity to be serviced, and wherein, when the avatar is within a defined spatial proximity of an object, a session is initiated automatically with an entity associated with the object and, when the avatar moves out of the defined spatial proximity, the session is disconnected automatically.

22. The method of claim 14, wherein the virtual reality environment is configured for likes and dislikes of a selected customer receiving the virtual reality environments and wherein different customers receive differing virtual reality environments.

* * * * *